Aug. 20, 1935.  J. J. GILBERT  2,012,126
SUBMARINE SIGNALING CABLE
Filed July 22, 1931
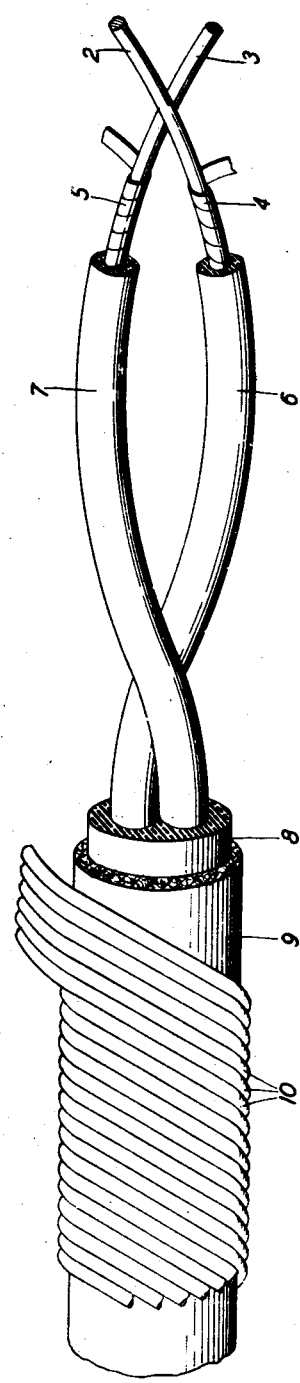
INVENTOR
J. J. GILBERT
BY
J. W. Schmied
ATTORNEY Patented Aug. 20, 1935

2,012,126

UNITED STATES PATENT OFFICE 2,012,126

SUBMARINE SIGNALING CABLE

John J. Gilbert, Douglaston, N. Y., assignor to Bell Telephone Laboratories, Incorporated, New York, N. Y., a corporation of New York Application July 22, 1931, Serial No. 552,355
In Great Britain August 19, 1930

1 Claim. (Cl. 173—266)

The present invention relates to submarine signaling cables, particularly to signaling cables of the twin-core or multi-core type. Hitherto twin-core and multi-core submarine cables have been constructed by twisting two or more insulated conductors together with jute wormings to form a cylindrical composite core over which jute servings and armor wires are applied. Usually the armor wires are laid in a direction opposite to that of the twist of the cores. When such cables are submerged into great depths encountered in transoceanic signaling lines, the strain which is exerted during the laying of the cable causes the armor wires to straighten out; this results in a rotation of the cable in a direction which increases the twist of the cores. This increased twist results in considerable strain on the cores, causing either a deformation of the insulation or breakage of the central conductors, particularly at the joints thereof.

The present invention has for its object to avoid this difficulty. To this effect the armor wires and the cores are laid in the same direction. With such a construction when the armor wires untwist under the tension the cores tend to untwist rather than twist and no tension is placed upon the conductors.

Furthermore, in accordance with this invention, in order to avoid excessive eddy current and/or other losses in the armor due to electro-magnetic coupling between the armor wires and the electrical circuit formed by the cores, the cores are given a pitch or angle of lay which is considerably different, preferably larger, than that of the armor wires.

The invention in a specific embodiment comprises a twin-core submarine cable having the cores twisted together and embedded in insulating material having a substantially cylindrical exterior surface. A layer of jute may be applied over this insulating material and the armor wires are applied externally over this jute layer concentric with the axis of the cable and wound in the same direction as the cores are twisted. The lay of the cores may be from 3 to 4 feet and that of the armor wires not more than 2 feet.

The invention will now be described with reference to the accompanying drawing, which shows one embodiment thereof. The drawing shows by way of example a twin-core submarine cable, the conductors being indicated by reference numerals 2 and 3 and the loading material by 4 and 5. The insulating material is indicated by numerals 6 and 7. These cores are embedded in extruded or otherwise applied insulating material 8, which is covered by a layer of jute 9. It will be seen that the twin-cores 2 and 3 are arranged with a left to right twist and the lay thereof is of substantial length, approximately 3 or 4 feet for example.

The armor wires indicated by reference numeral 10 are, according to this invention, laid in the same direction as that in which the cores are twisted. The lay or pitch of the wires is substantially shorter than that of the cores 2 and 3 and may be not more than 2 feet.

It will be seen that when tensile stresses are applied to a cable constructed as above described the armor wires will tend to twist the cores of the cable in a left to right direction and thereby untwist the cores 2 and 3 and no mechanical stresses will, under such conditions, be applied to the conductors which are likely to cause fracture or distortion.

What is claimed is:

A deep sea communication cable comprising at least one pair of core conductors forming the outgoing path and the return path of a single circuit, said conductors being covered with insulating material whereby they are electrically insulated from each other and from the surrounding medium when laid in water, said insulated conductors being spiraled about each other with a definite pitch or length of lay, and a plurality of armor wires constituting the total armor wire protection of said cable laid spirally around the structure comprising said insulated conductors, all of said armor wires being spiraled about said structure in the same direction as that in which said conductors are spiraled about each other and the pitch or length of lay of said armor wires being not longer than approximately one-half the pitch or length of lay of said conductors about one another.

JOHN J. GILBERT.